2,993,070
PROCESS FOR THE PRODUCTION OF TEREPHTHALIC ACID

Heinrich Hopff, Zurich, Switzerland, assignor to Deutsche Gold- und Silber-Scheideanstalt vormals Roessler, Frankfurt (Main), Germany
No Drawing. Filed Apr. 6, 1959, Ser. No. 804,126
4 Claims. (Cl. 260—524)

The present invention relates to an improved process for the production of terephthalic acid.

According to the invention it was found that terephthalic acid can be produced in good yields by treating 1,3,5-tritolyl benzene with strong oxidizing agents. Strong oxidizing agents which are suitable, for example, are: chromic acid dissolved in glacial acetic acid or sulfuric acid, as well as, dilute nitric acid at superatmospheric pressures. In the latter instance, the reaction must be carried out at temperatures above 180° C. in nitric acid resistant vessels of $V_2A$ steel. When chromic acid in glacial acetic acid or sulfuric acid solution is employed, boiling at normal pressure for a number of hours suffices. The terephthalic acid produced in the reaction precipitates out directly in crystalline form and can be recovered by filtration. When glacial acetic acid is employed as the solvent varying quantities of paratoluic acid are also produced, but these are also converted to terephthalic acid upon continuing the oxidation.

The following examples will serve to illustrate several embodiments of the invention.

Example 1

348 parts by weight of 1,3,5-tritolyl benzene, produced from paramethyl acetophenone by passing the latter over aluminum oxide at 200° C., were refluxed for 15 hours at 150° C. with 3000 parts by weight of sodium dichromate in 8000 parts by weight of 60% sulfuric acid. After the reaction mixture was diluted with an equal quantity of water, 350 parts by weight of terephthalic acid corresponding to a yield 70% of the theoretical separated out. The terephthalic acid was purified in the usual manner by recrystallization.

Example 2

348 parts weight of 1,3,5-tritolyl benzene were heated together with 6850 parts by weight of 14% nitric acid for 15 hours at 200° C. in an autoclave of stainless steel. After the excess nitric acid was evaporated, a mixture of terephthalic acid, paratoluic acid and 1,3,5-triparacarboxy phenyl benzene remained as a residue. This mixture was separated into its components by recrystallization. When longer periods of oxidation were employed at higher temperatures the proportion of terephthalic acid produced increased. Also, additions of oxidation accelerators, such as vanadium pentoxide or ammonium vanadate, increased the proportions of terephthalic acid produced. The concentration of nitric acid can be varied between 12 to 50%.

I claim:

1. A process for the production of terephthalic acid which comprises oxidizing 1,3,5-tritolyl benzene with an oxidizing agent selected from the group consisting of chromic acid dissolved in glacial acetic acid, chromic acid dissolved in sulfuric acid, and nitric acid of a concentration between 12 and 50% at an elevated temperature sufficiently high to effect oxidation of the 1,3,5-tritolyl benzene with the oxidizing agent to terephthalic acid.

2. The process of claim 1 in which a solution of chromic acid in glacial acetic acid is employed as the oxidizing agent and the oxidation is carried out at the boiling point of the reaction mixture.

3. The process of claim 1 in which a solution of chromic acid in sulfuric acid is employed as the oxidizing agent and the oxidation is carried out at the boiling point of the reaction mixture.

4. The process of claim 1 in which nitric acid of a concentration between 12 and 50% is employed as the oxidizing agent and the oxidation is carried out at a temperature above 180° C. under superatmospheric pressure.

No references cited.